United States Patent
Meinecke et al.

(10) Patent No.: US 6,943,727 B2
(45) Date of Patent: Sep. 13, 2005

(54) LENGTH MEASUREMENT WITH RADAR

(75) Inventors: Marc-Michael Meinecke, Sassenburg (DE); Ralph Mende, Braunschweig (DE); Marc Behrens, Braunschweig (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/734,819

(22) Filed: Dec. 12, 2003

(65) Prior Publication Data
US 2004/0140927 A1 Jul. 22, 2004

(30) Foreign Application Priority Data
Dec. 21, 2002 (DE) .......................................... 102 60 434

(51) Int. Cl.$^7$ ................................................ G01S 13/93
(52) U.S. Cl. ..................... 342/192; 342/70; 342/196; 340/933; 702/159
(58) Field of Search .......................... 342/70, 110, 132, 342/192, 196; 702/159; 340/933

(56) References Cited

U.S. PATENT DOCUMENTS

| | | | | |
|---|---|---|---|---|
| 3,406,395 A | * | 10/1968 | Zupanick | .................... 702/159 |
| 3,626,413 A | * | 12/1971 | Zachmann | .................... 340/933 |
| 4,985,705 A | * | 1/1991 | Stammler | .................... 342/192 |
| 5,402,346 A | * | 3/1995 | Lion et al. | .................... 340/933 |
| 6,239,738 B1 | | 5/2001 | Wanielik et al. | .............. 342/70 |

FOREIGN PATENT DOCUMENTS

| | | | |
|---|---|---|---|
| EP | 0 773 452 A1 | 10/1996 | ........... G01S/13/93 |
| EP | 1 031 851 A2 | 2/2000 | ............. G01S/7/40 |
| EP | 1 094 336 A2 | 10/2000 | ............. G01S/7/41 |

* cited by examiner

*Primary Examiner*—Ian J. Lobo
(74) *Attorney, Agent, or Firm*—Baker Botts L.L.P.

(57) ABSTRACT

In a method for determination of the length of objects in traffic, especially passenger cars, trucks, buses, motorbikes, bicycles and pedestrians, radar signals are transmitted by a vehicle, the radar signals are reflected by an object being measured, the reflected radar signals are received in the vehicle, the frequency spectra of the reflected radar signals are evaluated, and the reflection peaks contained in the frequency spectra are determined. Length measurement, by means of known radar sensors, from a vehicle is made possible by the fact that the width of the reflection peaks is determined, and that the length of the object being measured is determined by means of the determined width.

23 Claims, 6 Drawing Sheets

LENGTH MEASUREMENT WITH RADAR

PRIORITY

This application claims foreign priority of the German application DE 10260434.7 filed on Dec. 21, 2002.

TECHNICAL FIELD

The invention concerns a method for determination of the length of objects in traffic, especially passenger car, trucks, buses, motorbikes, bicycles and pedestrians, in which radar signals are emitted from a vehicle, the radar signals are reflected by an object being measured, the reflected radar signals are received in the vehicle, the frequency spectra of the reflected radar signals are evaluated and the reflection peaks contained in the frequency spectra are determined.

The invention also concerns a device for determination of the length of an object in traffic with a radar sensor that emits and receives radar signals, with a frequency analysis device that determines a frequency spectrum of the received radar signals, and with a detection device that determines reflection peaks contained in the frequency spectrum.

BACKGROUND OF THE INVENTION

Present-day driver assistance systems frequently operate with radar sensors. These radar sensors are now used for distance measurements and to determine relative speeds of observed objects. The azimuth angle under which an object is observed can also be determined with ordinary radar sensors.

Current and future comfort and safety systems for automobiles are described in the document "Optimized Transmitted Signal Proposal for Automobile Radar", M. M. Meinecke, Shaker Verlag 2001, ISBN 3-8265-9223-9. Different radar sensor techniques, with their properties, are also presented.

Figure 4:
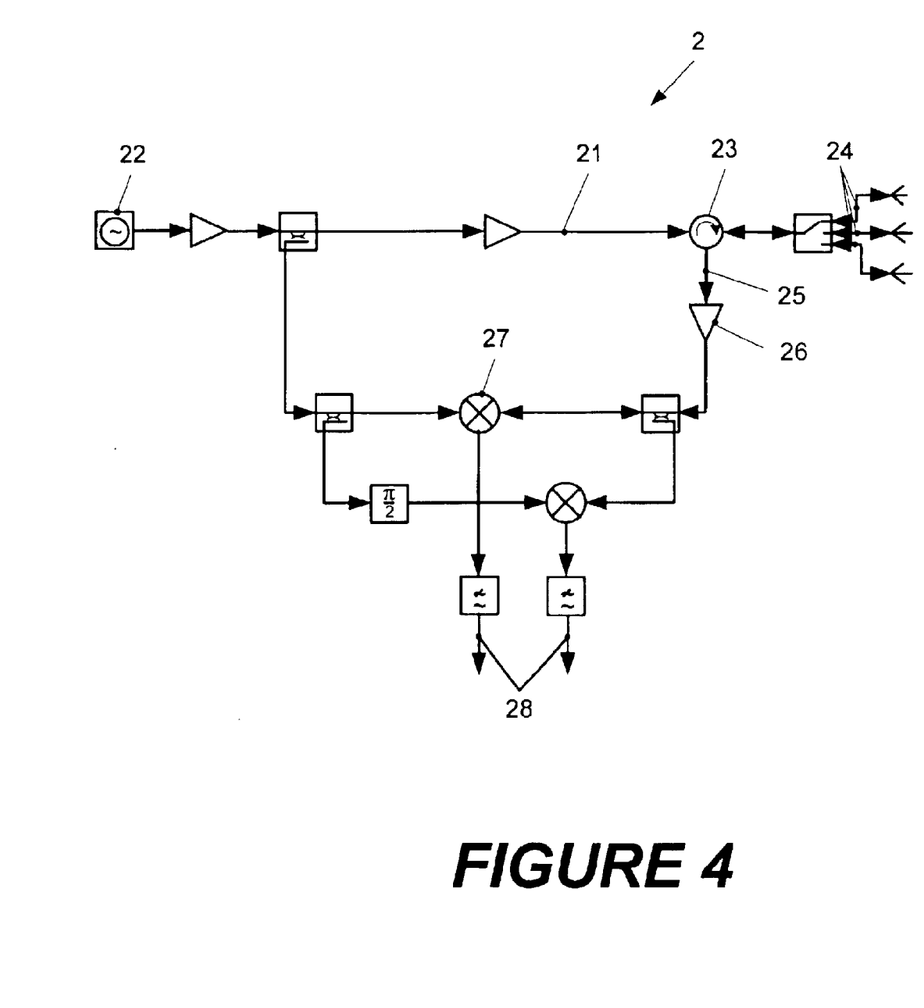
FIG. 4 shows the essential layout of a transmitting/receiving module with linear frequency modulated transmitted signals.

Linear frequency modulated continuous wave sensors (LFMCW sensors) are often used, whose essential design is shown in FIG. 4. Very precise distances can be determined with these sensors. This type of LFMCW radar sensor is characterized by its range resolution $\Delta R$, its maximum range $R_{max}$ and the speeds $V_{rel,min}$ to $v_{rel,max}$. The relations of radar parameters to transmitted signal relevant for the sensors are given by:

$$\Delta R = \frac{c}{2 f_{Hub,Radar}},$$

$$\Delta v = \frac{\lambda}{2 T_{Chirp,Radar}}$$

Hub=swing
in which the radar signal can consist of a sequence of linear chirps (linear frequency modulated transmitted signals) with different slopes. The radar signal is also modulated with a specific frequency swing. The slope $m_i$ of an individual chirp i is defined by $$m_i = \frac{f_{Hub,Chirp}}{f_{Hub,Radar}}$$

Hub=swing

The radar chirps are reflected by observed objects. The reflected radar chirps are represented as frequency peaks in the receiver in the frequency spectrum, for example, in an FFT analysis. The position of the peak then specifies the target coordinates in range or speed of the observed object.

Figure 1A:
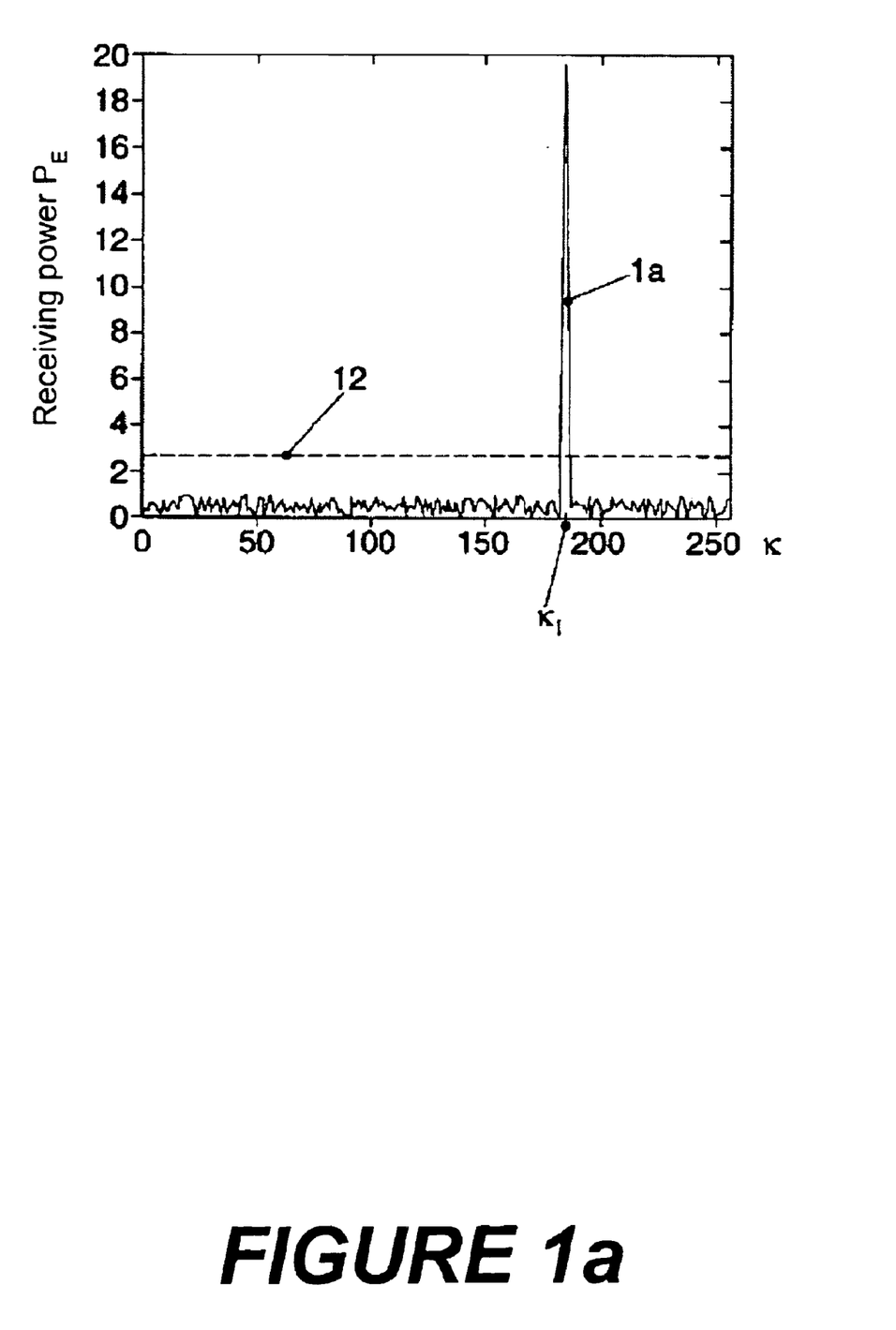
FIG. 1 shows a frequency spectrum of a point target.
Figure 1B:
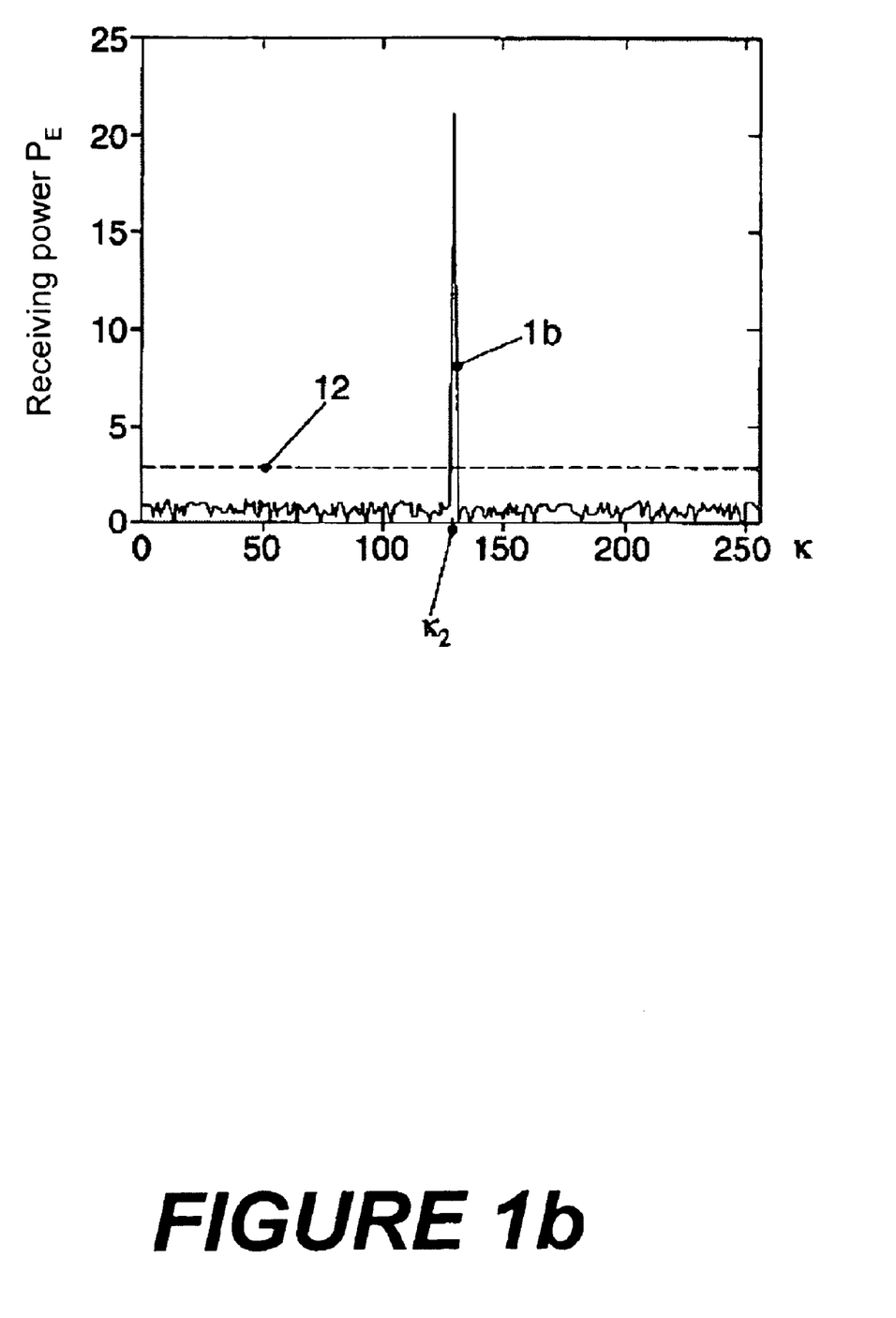

A frequency spectrum of a typical point target is shown as an example in FIG. 1. In this example an object is situated at a range R=100 m and has a relative speed of v=20 m/s. At a modulation swing of $f_{swing,radar}$=150 MHz and a measurement time of $T_{chirp,radar}$=2.5 ms, the spectrum shown in FIG. 1a is obtained for an upchirp (linear frequency up-modulated transmitted signal) and for a downchirp in FIG. 1b. As is apparent from the figures, the frequency peaks 1 are found at the frequencies $\kappa_1$=185 (FIG. 1a) and $\kappa_2$=129 (FIG. 1b).

The information of an individual chirp is ambiguous and restricts the target coordinates of the target only with respect to degrees of freedom, and the following applies $$v_{rel,f} = \frac{-\Delta v}{\Delta R} * m_1 * R_j + \Delta v * \kappa_1$$

in which $m_1$ is the normalized slope of chirp 1 and $\kappa_1$ is the corresponding measured normalized frequency in spectrum 1 (see FIG. 1a).

To eliminate ambiguity, several chirps of different slope can be used, in order to achieve an unambiguous measurement at the intersection of their lines.

Calculation of the intersection points in the range-relative speed diagram (R-$v_{rel}$ diagram) occurs by calculating all ideal intersection points of all lines from the up- and downchirps from all found frequency positions $\kappa_1$ (corresponding measured normalized frequency from spectrum 1 of chirp 1) and $\kappa_2$ (corresponding measured normalized frequency from spectrum 2 of chirp 2) according to the relation:

$$R_f = \Delta R \frac{\kappa_2 - \kappa_1}{m_1 - m_2},$$

$$v_{rel,i} = \Delta v \frac{m_1 \kappa_2 - m_2 \kappa_1}{m_1 - m_2}$$

It is also possible that additional linear chirps are evaluated to improve the results. It is also possible to carry out measurements according to linear frequency-modulated shift keying (LFMSK method, see "Optimized Transmitted Signal Proposal for Automobile Radars", M. M. Meinecke) or the frequency shift keying (FSK) method or according to pulse radar techniques. Other methods are also conceivable.

SUMMARY OF THE INVENTION

However, only determination of the range and relative speed between the measurement vehicle and the object being measured is possible in the described methods. However, it can also be necessary to recognize the size, i.e., the length, of an observed object. The underlying technical problem of the present invention is therefore to make possible length measurement from a vehicle by means of known radar sensors.

This technical problem just derived is solved according to the invention, in that the widths of the reflection peaks are determined, and that the length of the object being measured is determined by means of the determined width.

A method for determination of the length of objects in traffic, especially passenger cars, trucks, buses, motorbikes, bicycles and pedestrians, comprises the steps of:

emitting radar signals from a vehicle which are reflected by an object which is to be measured, receiving the reflected radar signals in the vehicle, evaluating the frequency spectra of the reflected radar signals, and determining the reflection peaks contained in the frequency spectra, determining the width of the reflection peaks, and determining the length of the object by means of the determined width.

From the vehicle a radar chirp can be emitted in a continuous wave radar or a pulse can be emitted in a pulse radar measurement method or a frequency shift keying (FSK) transmission signal can be emitted as a radar transmission signal. The length of the object can be determined from the range resolution $\Delta R$ of the radar chirp and the width of the reflection peaks $\Delta \kappa$ essentially according to the formula $L=\Delta R \cdot \Delta \kappa$. The width of the reflection peaks is determined at a specified amplitude. In a CW radar the frequency spectra of the reflected radar signals can be determined by fast Fourier transformation, or in a pulse radar the number of range gates, whose reception power are above the decision threshold can be measured. The radar signals can be generated by means of linear frequency modulated continuous wave radar sensors and/or pulse radar sensors and/or FSK-modulated sensors. The weight of the object can be estimated, at least by means of the determined length of the object. The determined weight of the object can be made available to driver assistance systems. By means of the determined weight or length of the object, interventions in the driving dynamics or protection devices, especially occupant protection devices or pedestrian protection devices, can be controlled. An estimated collision severity can be determined by means of the determined weight of the object. An object contour of the object can-be determined with an image processing camera system and/or a contour-measuring laser sensor. The determined object contours can be used to refine, adjust and/or verify additional vehicle data and/or for interpretation of the traffic scene closer to reality.

A device for determination of the length of an object in traffic, comprises a radar sensor that transmits and receives radar signals, a frequency analysis device that determines a frequency spectrum of the received radar signals, a detection device that determines reflection peaks contained in the frequency spectrum, wherein the detection device is designed to determine the width of the reflection peaks, and a length calculation device that calculates the length of the object being measured, partly from the width of the reflection peaks.

The radar sensor can be designed to emit a radar chirp in a continuous wave radar or a pulse in a pulse radar measurement method or a frequency shift keying (FSK) transmission signal as a radar transmission signal. The length calculation device can determine the length of the object from the range resolution $\Delta R$ of the radar chirp and the width of the reflection peaks $\Delta \kappa$ essentially according to the formula $L=\Delta R \cdot \Delta \kappa$. The radar sensor can be a CW radar and the frequency analysis device can operate with a Fast Fourier Transformation. The radar sensor can be a pulse radar. The radar signals can be generated by means of linear frequency modulated continuous wave radar sensors and/or pulse radar sensors and/or FSK-modulated sensors. The weight of the object can be estimated, at least by means of the determined length of the object. The determined weight of the object can be made available to driver assistance systems. The device may further comprise means to control interventions in the driving dynamics or protection devices, especially occupant protection devices or pedestrian protection devices by means of the determined weight or length of the object. The device may also further comprise means for determining an estimated collision severity by means of the determined weight of the object. The device may further comprise an image processing camera system and/or a contour-measuring laser sensor to determine an object contour.

In an elongated object, the reflected radar signals have subreflection zones that extend in the fashion of a plateau. Widening of the spectrum of a radar chirp permits conclusions be drawn concerning the length of an observed object, in which evaluation of widening of the spectrum is proposed according to the invention. Vehicles and other spatially extensive objects no longer appear in the radar spectrum as isolated peaks, as is the case in point targets, but as more or less extended plateaus. By evaluating these plateaus, it is possible for the first time to be able to determine the length of an observed object from a moving vehicle, in which the observed object may also be moving.

A good evaluation of the reflected radar received signals is obtained, if a radar chirp is emitted from the vehicle as a radar transmitted signal. Similarly, length measurements can be conducted in pulse radar techniques by evaluating the range gate.

Since the width of the plateau is proportional to the radial extent of the object, it is proposed that the length of the object being measured be determined from the range resolution $\Delta R$ of the radar chirp and the width of the reflection peak $\Delta \kappa$ according to the formula $L=\Delta R \cdot \Delta \kappa$. This relation permits simple and rapid calculation of the radial, i.e., length extent, from the observation location of the observed object and is therefore well suited for cost-effective implementation in a vehicle radar system. This applies appropriately for pulse radar techniques, in which the length calculation in this case is obtained according to the formula $L=\Delta R \cdot N$. The number of coherent range gates, in which detection occurs, is denoted N here. To make the length measurement more precise, estimation algorithms can additionally be used, which establish more precisely the beginning of the object and/or the end of the object, for example.

The received radar spectrum exhibits a background noise. This background noise naturally must have no effect on determination of the length of an object. In order to rule out background noise that has only a very low intensity, it is proposed that the width of the reflection peaks be determined at a specified amplitude. This means that only peaks that result with high probability from a reflection of a radar chirp are evaluated in the spectrum.

A convenient evaluation, especially with computer-supported calculation methods, is guaranteed by the fact that the frequency spectra of the reflected radar signals are determined by means of fast Fourier transformation.

It is advantageous if the radar signals are generated by linear frequency modulated continuous wave radar sensors. These continuous wave radar sensors have the advantage that they are already available in large numbers and are already incorporated in many vehicles.

According to an advantageous embodiment, which in itself is based on an invention, it is proposed that during rapid time changes in the position of the radar peaks in the frequency spectrum, the distance between the radar peaks is interpreted as the width of a reflection peak and the length of the object being measured is determined by means of this width of the reflection peak. Rapid changes in the position of radar peaks, so-called jumps, frequently occur in radar measurements. However, it can be determined based on the time change whether these jumps are due to altered coordinates of an observed object or not. For a case in which the jumps are no longer attributable to vehicle movements, the coordinates of the individual peaks can be used as Δ coordinates for length determination.

It is often necessary to recognize the mass of an object for safety-relevant (for example, precrash applications), or also comfort-oriented (for example, distance control systems) applications in a vehicle, for which purpose it is proposed that the weight of the object be estimated, at least by means of the determined length of the object beam measurement, and with corresponding standard object widths and/or standard object heights. Such an estimate can occur, for example, with additional sensor information, object interpretation, hypotheses or other techniques.

It is helpful in precrash systems if the driver assistance systems are controlled by means of the determined weight of the object. It is also useful if occupant protection equipment is controlled by means of the determined weight of the object, or if an estimate of the collision severity can be predicted. The weight is particularly helpful in estimating collision severity, since an airbag or belt tightener can be triggered by this.

For determination of an object contour true to reality, it is proposed that object surfaces of the object being measured be determined by means of an image processing camera system or a contour-measuring laser sensor. With this the available data can be verified, refined and/or adjusted better to each other and/or an interpretation of the traffic scene closer to reality achieved.

Another object of the invention, with which the technical problem according to the invention is also solved, is a device for determination of the length of an object in traffic, especially with the aforementioned method, characterized by the fact that the detection device is designed to determine the width of the reflection piece, and that a length calculation device that calculates the length of the object being measured, partly from the width of the reflection piece, is provided. Because of this, devices for occupant protection can be controlled in targeted fashion, since an estimation of the consequences of an action is made possible.

BRIEF DESCRIPTION OF THE DRAWINGS

The invention is further explained below with reference to a drawing depicting a practical example. In the drawing.

DETAILED DESCRIPTION OF THE PREFERRED EMBODIMENTS

Figure 2:
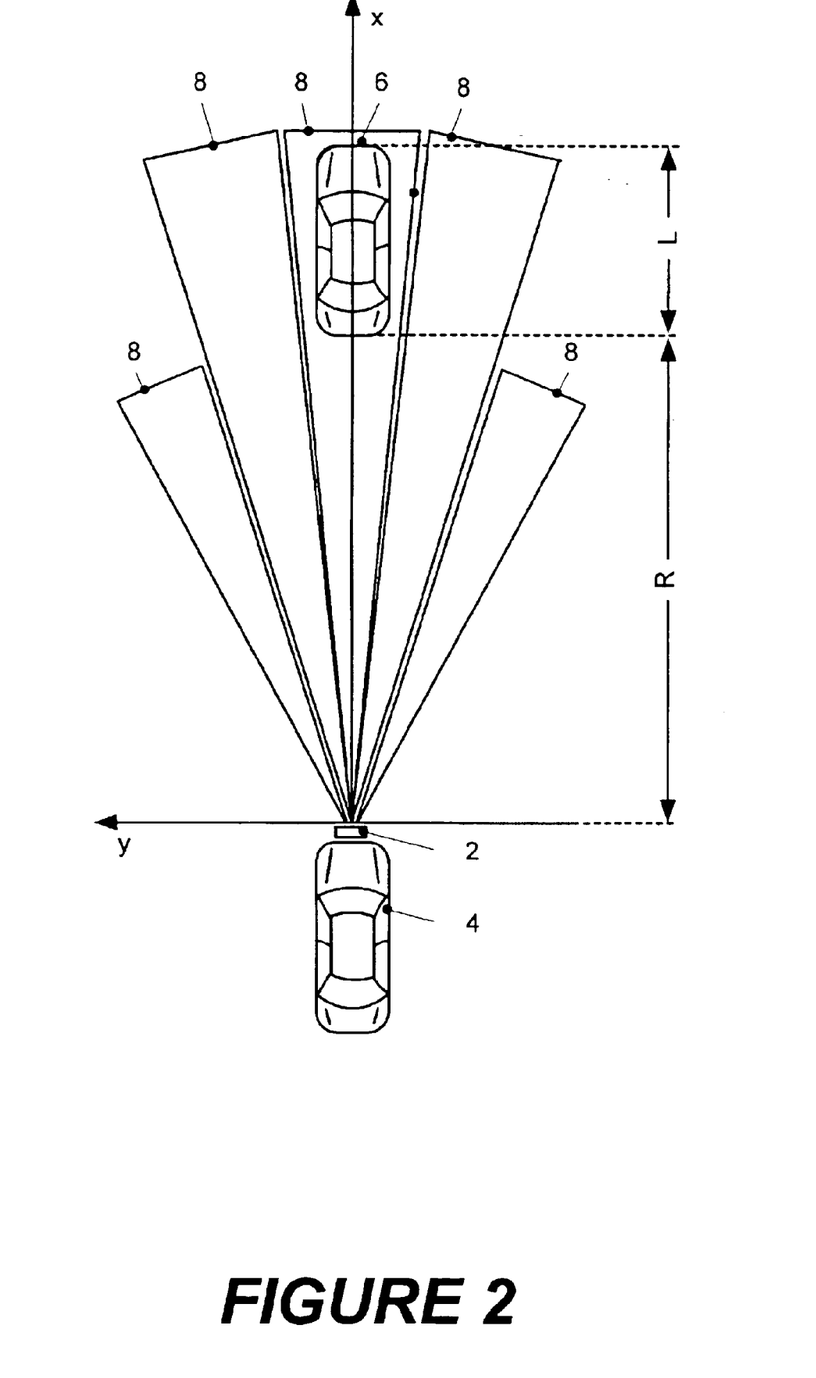
FIG. 2 shows an example of a radar device according to the invention for use in a vehicle.

A radar lobe 8 of a radar sensor 2 is schematically depicted in FIG. 2, which is designed as a transmitter and receiver. The radar sensor 2 emits radar signals, depicted in the x-y plane. The radar sensor 2 is arranged on a vehicle 4. A vehicle 6 to be observed is picked up with the radar sensor 2. The vehicle 6 being observed is at a range R from the vehicle 4 and has an extent L measured radially to the sensor origin. In order to be able to pick up the vehicle 6 being observed, radar chirps are emitted by radar sensor 2. The radar chirps are reflected by the vehicle 6 being observed and received in sensor 2. The received chirps can be evaluated in vehicle 2 and used to determine the radial extent L of the vehicle 6 being observed.

Figure 3A:
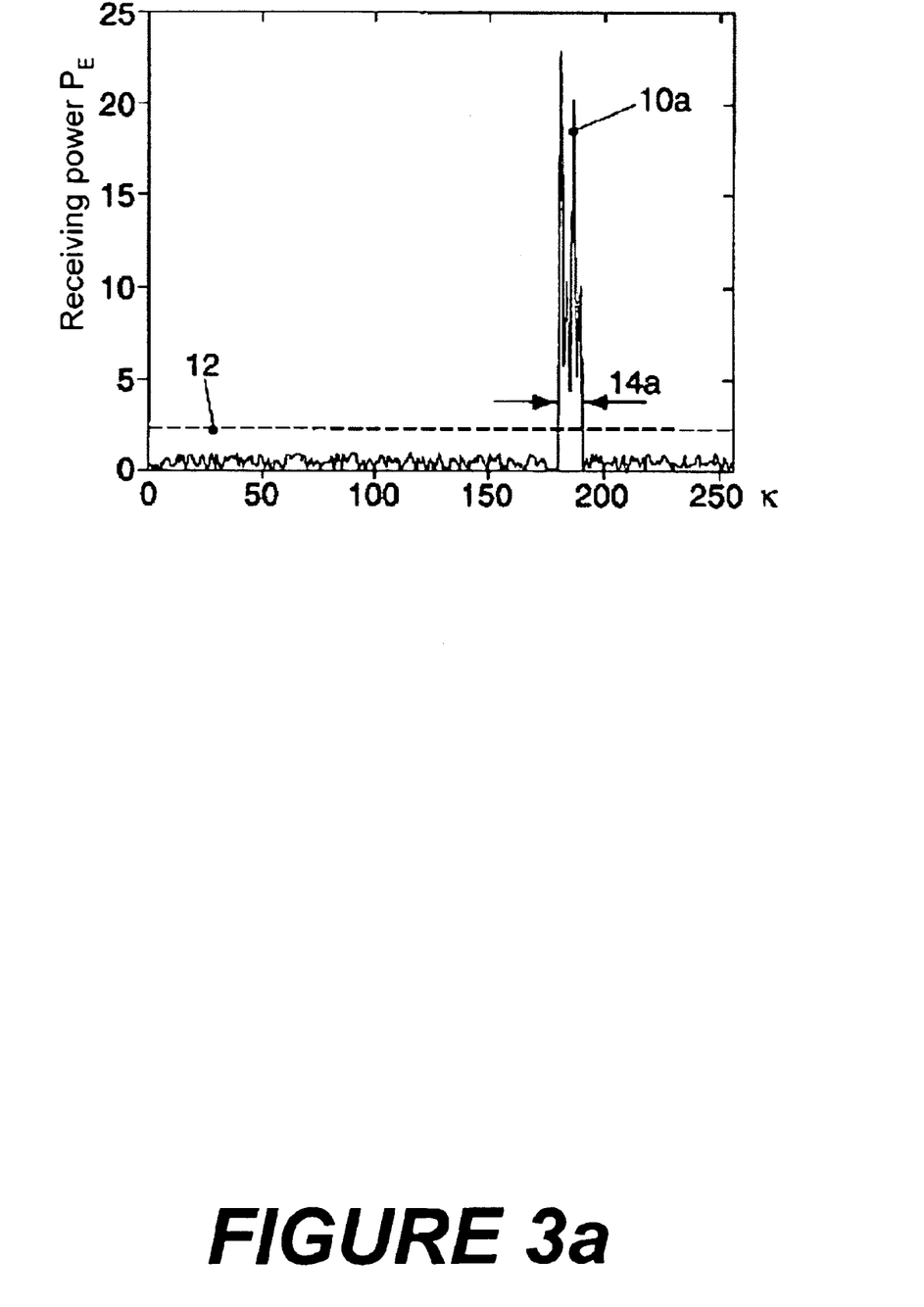
FIG. 3 shows a frequency spectrum of an extended target.
Figure 3B:
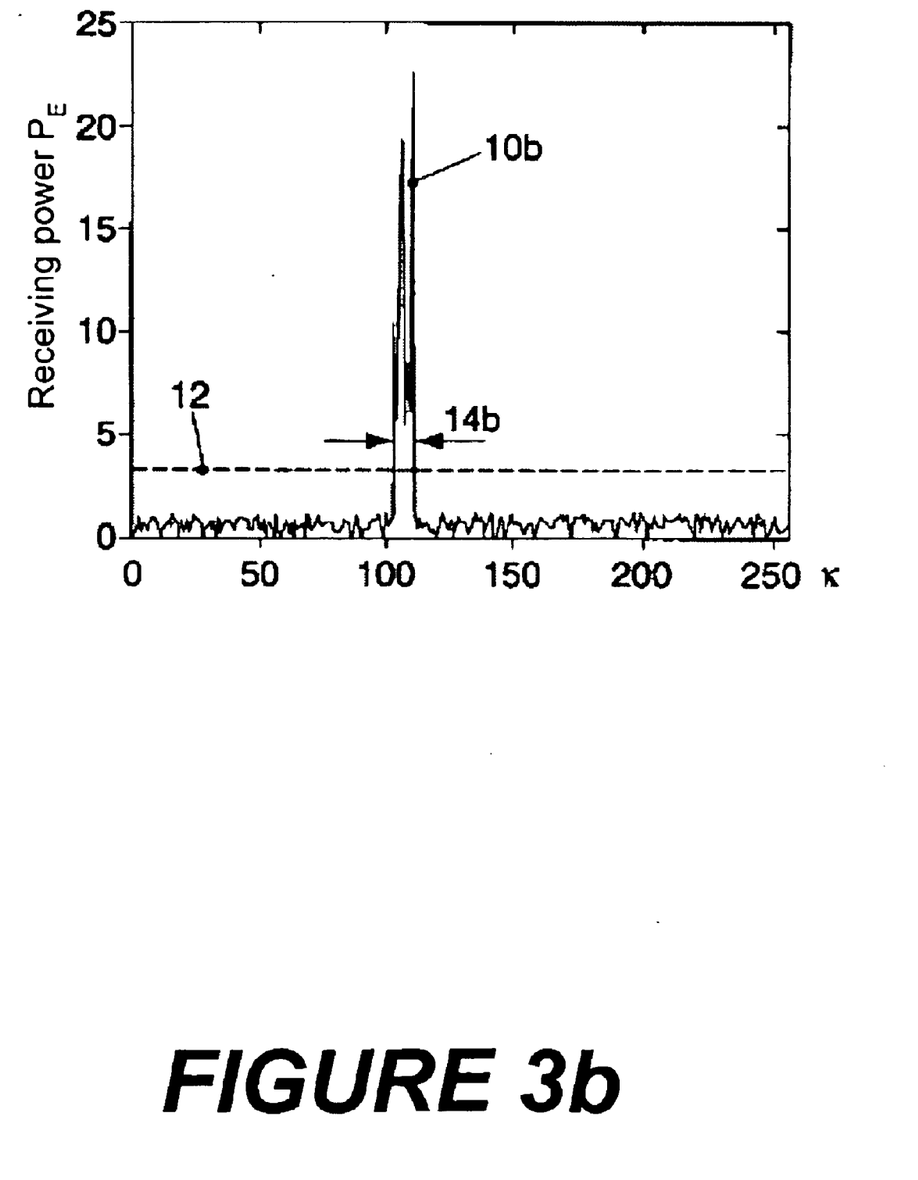

Determination of the radial extent is further explained in FIG. 3. A spectrum of an upchirp is shown in FIG. 3a and that of a downchirp in FIG. 3b. The spectrum initially has a background noise that can be recognized by the numerous small peaks in its trend. In addition to the peaks of the background noise, the spectrum, as is apparent in FIG. 3, has individual peaks 10. These peaks 10 lie above a predeterminable decision threshold 12 (for example, constant false alarm rate threshold), which is provided to separate target messages from noise.

The peaks 10a, 10b have a width 14a, 14b that can be determined with appropriate evaluation devices. This width 14a, 14b of peaks 10a, 10b can be used to determine the radial extent L of the observed vehicle. The range resolution ΔR of the sensor is determined by the frequency swing of a chirp. In addition to range resolution ΔR, the width 14a, 14b (Δκ) of the peak is used, in order to determine the length L of the observed vehicle. The length can be determined by $$L=\Delta R*\Delta\kappa$$

Owing to the fact that the length of a vehicle is known, its weight can be estimated with additional data or assumptions and this used to control, for example, precrash systems, or to make the recognized object data available to additional driver assistance systems via data connection. For example, the weight of an observed vehicle can be estimated, which permits metered triggering of a belt tightener or airbag.

The transmitting/receiving module 2 depicted in FIG. 4 can be used to implement a radar front end. It consists in the transmitting branch 21 (Tx) essentially of the central components of a controllable oscillator 22 (VCO), a circulator 23 for transmitted/received signal separation and the antennas 24 with the corresponding antenna switches. In the receiving branch 25 (Rx) a quadrature modulator 27 that mixes the HF signals e(t) in two channels in base band 28 is situated after the low-noise amplifier 26. The base band signal 28 m(t) is therefore complex in this exemplified design.

We claim:

1. A method for determination of the length of objects in traffic, especially passenger cars, trucks, buses, motorbikes, bicycles and pedestrians, comprising the steps of:

emitting radar signals from a vehicle which are reflected by an object which is to be measured, receiving the reflected radar signals in the vehicle, evaluating the frequency spectra of the reflected radar signals, and determining the reflection peaks contained in the frequency spectra, determining the width of the reflection peaks, and determining the length of the object by means of the determined width.

2. The method according to claim 1, wherein from the vehicle a radar chirp is emitted in a continuous wave radar or a pulse is emitted in a pulse radar measurement method or a frequency shift keying (FSK) transmission signal is emitted as a radar transmission signal.

3. The method according to claim 1, wherein the length of the object is determined from the range resolution ΔR of a radar chirp and the width of the reflection peaks Δκ essentially according to the formula L=ΔR·Δκ.

4. The method according to claim 1, wherein the width of the reflection peaks is determined at a specified amplitude.

5. The method according to claim 1, wherein in a CW radar the frequency spectra of the reflected radar signals are determined by Fast Fourier Transformation, or in a pulse radar the number of range gates, whose reception power are above the decision threshold are measured.

6. The method according to claim 1, wherein the radar signals are generated by means of linear frequency modulated continuous wave radar sensors and/or pulse radar sensors and/or FSK-modulated sensors.

7. The method according to claim 1, wherein the weight of the object is estimated, at least by means of the determined length of the object.

8. The method according to claim 7, wherein the determined weight of the object is made available to driver assistance systems.

9. The method according to claim 7, wherein by means of the determined weight or length of the object, interventions in the driving dynamics or protection devices, especially occupant protection devices or pedestrian protection devices, are controlled.

10. The method according to claim 7, wherein an estimated collision severity is determined by means of the determined weight of the object.

11. The method according to claim 1, wherein an object contour of the object is determined with an image processing camera system and/or a contour-measuring laser sensor.

12. The method according to claim 11, wherein the determined object contours are used to refine, adjust and/or verify additional vehicle data and/or for interpretation of the traffic scene closer to reality.

13. A device for determination of the length of an object in traffic, comprising:
  a radar sensor that transmits and receives radar signals,
  a frequency analysis device that determines a frequency spectrum of the received radar signals,
  a detection device that determines reflection peaks contained in the frequency spectrum, wherein the detection device is designed to determine the width of the reflection peaks, and
  a length calculation device that calculates the length of the object being measured, partly from the width of the reflection peaks.

14. The device according to claim 13, wherein the radar sensor is designed to emit a radar chirp in a continuous wave radar or a pulse in a pulse radar measurement method or a frequency shift keying (FSK) transmission signal as a radar transmission signal.

15. The device according to claim 13, wherein the length calculation device determines the length of the object from the range resolution $\Delta R$ of a radar chirp and the width of the reflection peaks $\Delta \kappa$ essentially according to the formula $L = \Delta R \cdot \Delta \kappa$.

16. The device according to claim 13, wherein the radar sensor is a CW radar and the frequency analysis device operates with a Fast Fourier Transformation.

17. The device according to claim 13, wherein the radar sensor is a pulse radar.

18. The device according to claim 13, wherein the radar signals are generated by means of linear frequency modulated continuous wave radar sensors and/or pulse radar sensors and/or FSK-modulated sensors.

19. The device according to claim 13, wherein the weight of the object is estimated, at least by means of the determined length of the object.

20. The device according to claim 19, wherein the determined weight of the object is made available to driver assistance systems.

21. The device according to claim 19, further comprising means to control interventions in the driving dynamics or protection devices, especially occupant protection devices or pedestrian protection devices by means of the determined weight or length of the object.

22. The device according to claim 19, further comprising means for determining an estimated collision severity by means of the determined weight of the object.

23. The device according to claim 13, further comprising an image processing camera system and/or a contour-measuring laser sensor to determine an object contour.

* * * * *